(12) United States Patent
Trum

(10) Patent No.: US 9,759,569 B2
(45) Date of Patent: Sep. 12, 2017

(54) APPARATUS AND METHOD FOR DETERMINING PARKING INFORMATION

(71) Applicant: TomTom International B.V., Amsterdam (NL)

(72) Inventor: Jeroen Trum, Eindhoven (NL)

(73) Assignee: TomTom Traffic B.V., Amsterdam (NL)

( * ) Notice: Subject to any disclaimer, the term of this patent is extended or adjusted under 35 U.S.C. 154(b) by 0 days.

(21) Appl. No.: 14/321,900

(22) Filed: Jul. 2, 2014

(65) Prior Publication Data

US 2014/0313060 A1    Oct. 23, 2014

Related U.S. Application Data

(63) Continuation of application No. 12/736,673, filed as application No. PCT/EP2009/057879 on Jun. 24, 2009, now Pat. No. 8,847,790.

(Continued)

(51) Int. Cl.
*G08G 1/14* (2006.01)
*G01C 21/34* (2006.01)
(Continued)

(52) U.S. Cl.
CPC ......... *G01C 21/34* (2013.01); *G01C 21/3476* (2013.01); *G01C 21/3614* (2013.01); *G01C 21/3682* (2013.01); *G01C 21/3685* (2013.01); *G08G 1/091* (2013.01); *G08G 1/0969* (2013.01); *G08G 1/09675* (2013.01); *G08G 1/096716* (2013.01); *G08G 1/096775* (2013.01); *G08G 1/096827* (2013.01); *G08G 1/096844* (2013.01); *G08G 1/096861* (2013.01);
(Continued)

(58) Field of Classification Search
CPC .............. G01C 21/265; G01C 21/3605; G01C 21/3614; G01C 21/3679; G01C 21/3685; G08G 1/141; G08G 1/148
USPC .......... 340/932.2, 539.13, 990, 995.1, 686.1; 235/384, 385; 701/23, 24, 207, 208, 209, 701/200, 300; 705/10, 13
See application file for complete search history.

(56) References Cited

U.S. PATENT DOCUMENTS 6,246,337 B1    6/2001    Rosenberg et al.
6,266,609 B1    7/2001    Fastenrath
(Continued)

FOREIGN PATENT DOCUMENTS

EP    1058089 A2    12/2000
EP    1906375 A2    4/2008
(Continued)

OTHER PUBLICATIONS

International Search Report issued Nov. 3, 2009 regarding International Application No. PCT/EP2009/057879.

(Continued)

*Primary Examiner* — Hung T Nguyen

(57) ABSTRACT

A navigation device and a method of determining parking information are disclosed. In at least one embodiment, the method includes receiving, at a server, journey information from a plurality of navigation devices, the journey information indicating one or more journeys made by each navigation device and determining, by the server from the journey information, parking information indicating a geographical location of one or more parking areas.

20 Claims, 10 Drawing Sheets

Related U.S. Application Data

(60) Provisional application No. 61/129,413, filed on Jun. 25, 2008.

(51) Int. Cl.

| | | |
|---|---|---|
| *G01C 21/36* | (2006.01) | |
| *G08G 1/09* | (2006.01) | |
| *G08G 1/0967* | (2006.01) | |
| *G08G 1/0968* | (2006.01) | |
| *G08G 1/0969* | (2006.01) | |

(52) U.S. Cl.
CPC . *G08G 1/096883* (2013.01); *G08G 1/096888* (2013.01); *G08G 1/141* (2013.01)

(56) References Cited

U.S. PATENT DOCUMENTS

| | | | |
|---|---|---|---|
| 6,381,537 | B1 | 4/2002 | Chenault et al. |
| 6,389,356 | B1* | 5/2002 | Onishi ............... G01C 21/32 340/995.18 |
| 6,640,187 | B1 | 10/2003 | Chenault et al. |
| 6,650,250 | B2 | 11/2003 | Muraki |
| 6,927,700 | B1* | 8/2005 | Quinn .................. 340/932.2 |
| 6,946,974 | B1 | 9/2005 | Racunas, Jr. |
| 7,096,100 | B2 | 8/2006 | Arata |
| 7,215,255 | B2 | 5/2007 | Grush |
| 7,312,722 | B2 | 12/2007 | Tillotson et al. |
| 7,375,649 | B2 | 5/2008 | Gueziec |
| 7,395,149 | B2 | 7/2008 | Matsumoto et al. |
| 7,610,146 | B2 | 10/2009 | Breed |
| 7,860,647 | B2 | 12/2010 | Amano |
| 7,899,583 | B2 | 3/2011 | Mendelson |
| 8,635,017 | B2 | 1/2014 | Geelen et al. |
| 8,890,715 | B2 | 11/2014 | Geelen |
| 2002/0161520 | A1 | 10/2002 | Dutta et al. |
| 2004/0181495 | A1 | 9/2004 | Grush |
| 2004/0254840 | A1* | 12/2004 | Slemmer et al. ............ 705/22 |
| 2005/0021227 | A1* | 1/2005 | Matsumoto et al. ......... 701/207 |
| 2006/0250278 | A1 | 11/2006 | Tillotson et al. |
| 2006/0253226 | A1 | 11/2006 | Mendelson |
| 2006/0267799 | A1* | 11/2006 | Mendelson ............... 340/932.2 |
| 2007/0038362 | A1 | 2/2007 | Gueziec |
| 2007/0129974 | A1* | 6/2007 | Chen et al. .................. 705/5 |
| 2008/0033640 | A1* | 2/2008 | Amano ....................... 701/209 |
| 2008/0040029 | A1 | 2/2008 | Breed |
| 2008/0048885 | A1 | 2/2008 | Quinn |
| 2008/0065325 | A1 | 3/2008 | Geelen et al. |
| 2008/0201074 | A1 | 8/2008 | Bleckman et al. |
| 2009/0091477 | A1 | 4/2009 | McCall et al. |
| 2009/0248577 | A1 | 10/2009 | Hoj |
| 2010/0106514 | A1 | 4/2010 | Cox |
| 2010/0211304 | A1 | 8/2010 | Hwang et al. |

FOREIGN PATENT DOCUMENTS

| | | |
|---|---|---|
| FR | 2909477 A | 6/2008 |
| JP | 2000194994 A | 7/2000 |
| JP | 2005249539 A | 9/2005 |
| JP | 2008002978 A | 1/2008 |
| JP | 2009086993 A | 4/2009 |
| JP | 2009524041 A | 6/2009 |
| RU | 2172520 C2 | 8/2001 |
| WO | 2007083997 A1 | 7/2007 |

OTHER PUBLICATIONS

International Search Report issued Aug. 4, 2010 for International Application No. PCT/EP2009/050362.
International Search Report issued May 6, 2009 for International Application No. PCT/EP2009/050376.
Find Available Parking on Your Mobile Phone, Apr. 3, 2008. parking-net.com/.../Find-Available-Parking-on-Your-Mobile-Phone Retrieved from the Internet Jan. 11, 2011.
Li, Dongpin, et. al, "Research on Vehicle Short Interval Arriving and Departing Character in Urban Center Area," Modern Transportation Technology, vol. 4, No. 2, Apr. 2007.

* cited by examiner ature; APPARATUS AND METHOD FOR
DETERMINING PARKING INFORMATION The present application is a continuation of U.S. patent application Ser. No. 12/736,673, filed on Nov. 23, 2010, now U.S. Pat. No. 8,847,790, which is the National Stage of International Application No. PCT/EP2009/057879, filed Jun. 24, 2009 and designating the United States, which claims benefit to U.S. Provisional Patent Application Ser. No. 61/129,413 filed on Sep. 25, 2008. The entire contents of these applications are incorporated herein by reference.

FIELD OF THE INVENTION

This invention relates to an apparatus and method for determining parking information. In particular, although not exclusively, the present invention relates to apparatus and methods for determining a location and number of parking places. Embodiments of the present invention are illustrated in relation to portable navigation devices (so-called PNDs), in particular PNDs that include Global Positioning System (GPS) signal reception and processing functionality.

BACKGROUND TO THE INVENTION

Portable navigation devices (PNDs) that include GPS (Global Positioning System) signal reception and processing functionality are well known and are widely employed as in-car or other vehicle navigation systems.

In general terms, a modern PNDs comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In a particularly preferred arrangement the output interface display may be configured as a touch sensitive display (by means of a touch sensitive overlay or otherwise) to additionally provide an input interface by means of which a user can operate the device by touch.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Wi-Fi, Wi-Max GSM and the like.

PND devices of this type also include a GPS antenna by means of which satellite-broadcast signals, including location data, can be received and subsequently processed to determine a current location of the device.

The PND device may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically such features are most commonly provided in in-vehicle navigation systems, but may also be provided in PND devices if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the driver's own preferences for the factors determining road choice (for example the driver may specify that the route should not include motorways or toll roads).

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant) a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, the Royal Automobile Club (RAC) provides an on-line route planning and navigation facility at http://www.rac.co.uk, which facility allows a user to enter a start point and a destination whereupon the server to which the user's PC is connected calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of current and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

It is also known to allow a route to be calculated with user defined criteria; for example, the user may prefer a scenic route to be calculated by the device, or may wish to avoid any roads on which traffic congestion is likely, expected or currently prevailing. The device software would then calculate various routes and weigh more favourably those that include along their route the highest number of points of interest (known as POIs) tagged as being for example of scenic beauty, or, using stored information indicative of prevailing traffic conditions on particular roads, order the calculated routes in terms of a level of likely congestion or delay on account thereof. Other POI-based and traffic information-based route calculation and navigation criteria are also possible.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above, for example the 720T model manufactured and supplied by TomTom International B.V., provide a reliable means for enabling users to navigate from one position to another.

Frequently, users of such navigation devices wish to park their vehicles. Whilst the map data used for route determination may identify a location of commercial parking areas i.e. car parks, frequently many parking areas are not commercially operated and are not identified in the map data. For example, on-street parking areas may not be identified in the map data yet may still be frequently available for vehicle parking. Furthermore, it is difficult to determine the likelihood of a space being available in a parking area, even when that parking area is identified in the map data.

It is an aim of the present invention to address this problem, in particular to attempt to provide an apparatus and method of identifying parking areas. Some embodiments of the present invention also aim to determine a likelihood of a parking place being available in a parking area.

SUMMARY OF THE INVENTION

In pursuit of this aim, a presently preferred embodiment of the present invention provides a method of determining parking information, comprising the steps of: receiving, at a server, journey information from a plurality of navigation devices, the journey information indicating one or more journeys made by each navigation device; and determining, by the server from the journey information, parking information indicating a geographical location of one or more parking areas.

Another embodiment of the present invention relates to a computer for determining parking information, comprising: a data communications device for receiving journey information from navigation devices, the journey information indicating one or more journeys made by each navigation device; a parking availability profile (PAP) module executing on the server, wherein the PAP module is arranged to determine, from the journey information, parking information indicating a geographical location of one or more parking areas.

Yet another embodiment of the present invention relates to computer software comprising one or more software modules operable, when executed in an execution environment, to cause a processor to determine parking information, comprising the steps of: receiving, at a server, journey information from a plurality of navigation devices, the journey information indicating one or more journeys made by each navigation device; and determining, by the server from the journey information, parking information indicating a geographical location of one or more parking areas.

Advantages of these embodiments are set out hereafter, and further details and features of each of these embodiments are defined in the accompanying dependent claims and elsewhere in the following detailed description.

BRIEF DESCRIPTION OF THE DRAWINGS

Various aspects of the teachings of the present invention, and arrangements embodying those teachings, will hereafter be described by way of illustrative example with reference to the accompanying drawings, in which.

DETAILED DESCRIPTION OF PREFERRED EMBODIMENTS

Preferred embodiments of the present invention will now be described with particular reference to a PND. It should be remembered, however, that the teachings of the present invention are not limited to PNDs but are instead universally applicable to any type of processing device that is configured to execute navigation software so as to provide route planning and navigation functionality. It follows therefore that in the context of the present application, a navigation device is intended to include (without limitation) any type of route planning and navigation device, irrespective of whether that device is embodied as a PND, a navigation device built into a vehicle, or indeed a computing resource (such as a desktop or portable personal computer (PC), mobile telephone or portable digital assistant (PDA)) executing route planning and navigation software.

It will also be apparent from the following that the teachings of the present invention even have utility in circumstances where a user is not seeking instructions on how to navigate from one point to another, but merely wishes to be provided with a view of a given location. In such circumstances the "destination" location selected by the user need not have a corresponding start location from which the user wishes to start navigating, and as a consequence references herein to the "destination" location or indeed to a "destination" view should not be interpreted to mean that the generation of a route is essential, that travelling to the "destination" must occur, or indeed that the presence of a destination requires the designation of a corresponding start location.

Figure 1:
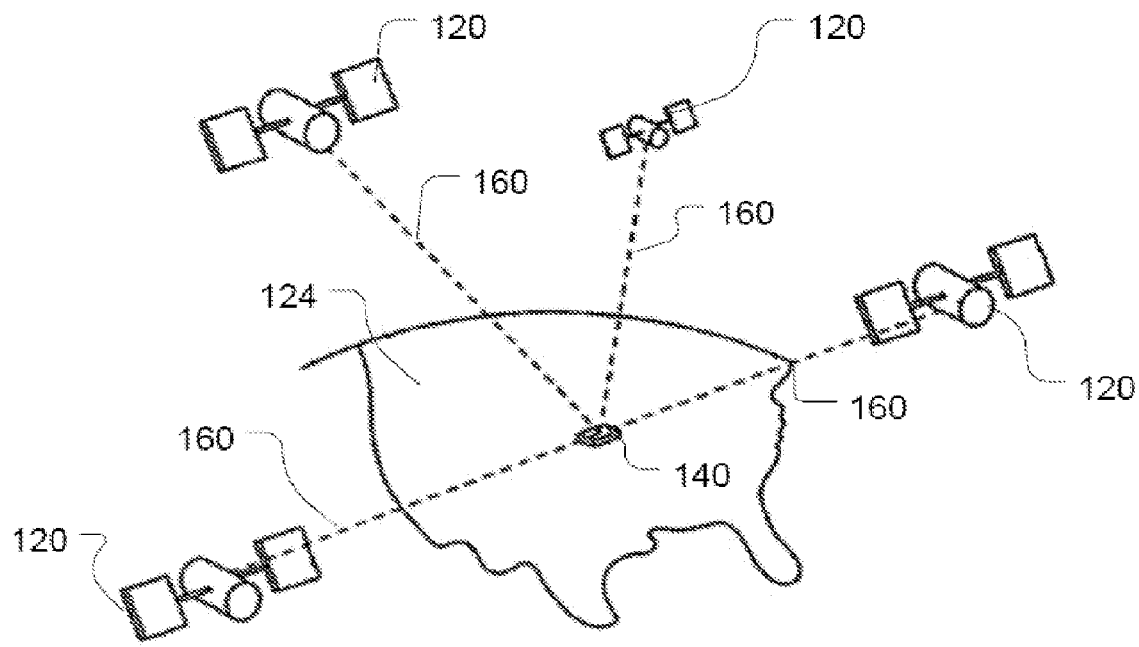
FIG. 1 is a schematic illustration of a Global Positioning System (GPS)

With the above provisos in mind, FIG. 1 illustrates an example view of Global Positioning System (GPS), usable by navigation devices. Such systems are known and are used for a variety of purposes. In general, GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140 is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
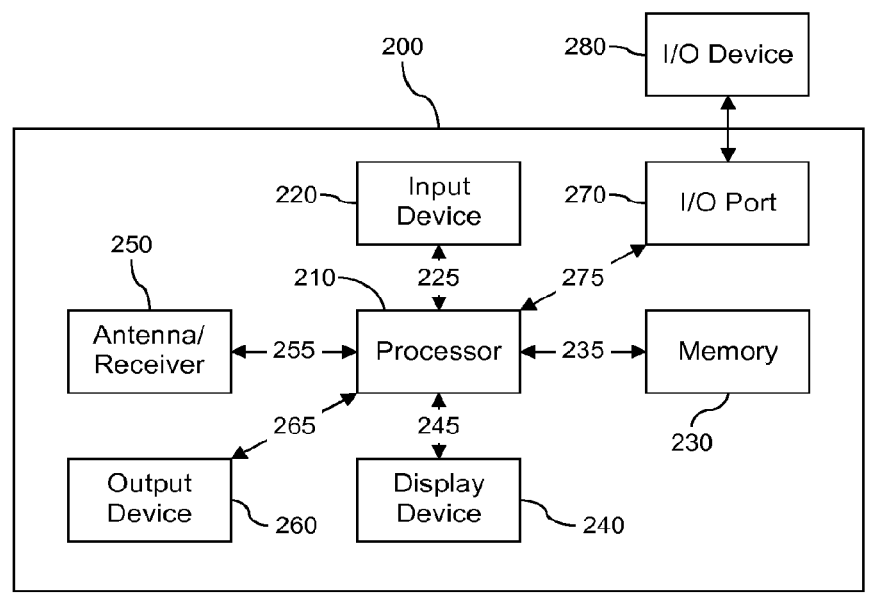
FIG. 2 is a schematic illustration of electronic components arranged to provide a navigation device.

FIG. 2 is an illustrative representation of electronic components of a navigation device 200 according to a preferred embodiment of the present invention, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch panel and/or any other known input device utilised to input information; and the display screen 240 can include any type of display screen such as an LCD display, for example. In a particularly preferred arrangement the input device 220 and display screen 240 are integrated into an integrated input and display device, including a touchpad or touchscreen input so that a user need only touch a portion of the display screen 240 to select one of a plurality of display choices or to activate one of a plurality of virtual buttons.

The navigation device may include an output device 260, for example an audible output device (e.g. a loudspeaker).

As output device 260 can produce audible information for a user of the navigation device 200, it is should equally be understood that input device 240 can include a microphone and software for receiving input voice commands as well.

In the navigation device 200, processor 210 is operatively connected to and set to receive input information from input device 220 via a connection 225, and operatively connected to at least one of display screen 240 and output device 260, via output connections 245, to output information thereto. Further, the processor 210 is operably coupled to a memory resource 230 via connection 235 and is further adapted to receive/send information from/to input/output (I/O) ports 270 via connection 275, wherein the I/O port 270 is connectible to an I/O device 280 external to the navigation device 200. The memory resource 230 comprises, for example, a volatile memory, such as a Random Access Memory (RAM) and a non-volatile memory, for example a digital memory, such as a flash memory. The external I/O device 280 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered to be within the scope of the present application. For example, the components shown in FIG. 2 may be in communication with one another via wired and/or wireless connections and the like. Thus, the scope of the navigation device 200 of the present application includes a portable or handheld navigation device 200.

In addition, the portable or handheld navigation device 200 of FIG. 2 can be connected or "docked" in a known manner to a vehicle such as a bicycle, a motorbike, a car or a boat for example. Such a navigation device 200 is then removable from the docked location for portable or handheld navigation use.

Figure 3:
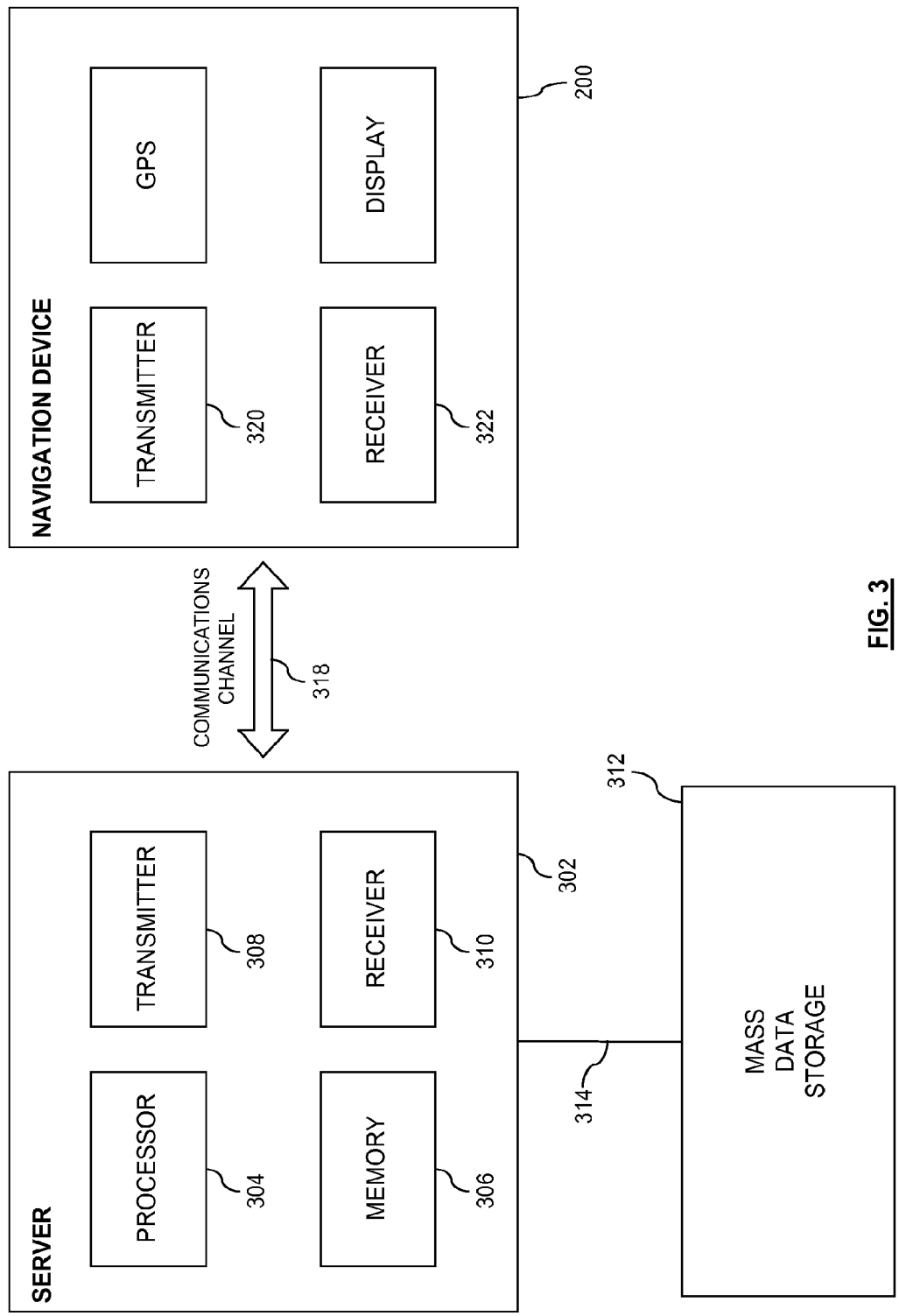
FIG. 3 is a schematic illustration of the manner in which a navigation device may receive information over a wireless communication channel.

Referring now to FIG. 3, the navigation device 200 may establish a "mobile" or telecommunications network connection with a server 302 via a mobile device (not shown) (such as a mobile phone, PDA, and/or any device with mobile phone technology) establishing a digital connection (such as a digital connection via known Bluetooth technology for example). Thereafter, through its network service provider, the mobile device can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device (via a service provider) and another device such as the server 302, using an internet (such as the World Wide Web) for example, can be done in a known manner. This can include use of TCP/IP layered protocol for example. The mobile device can utilize any number of communication standards such as CDMA, GSM, WAN, etc.

As such, an internet connection may be utilised which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet).

The navigation device 200 can further complete a data connection with the mobile device, and eventually with the internet and server 302, via existing Bluetooth technology for example, in a known manner, wherein the data protocol can utilize any number of standards, such as the GSRM, the Data Protocol Standard for the GSM standard, for example.

The navigation device 200 may include its own mobile phone technology within the navigation device 200 itself (including an antenna for example, or optionally using the internal antenna of the navigation device 200). The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the internet for example, in a manner similar to that of any mobile device.

For GRPS phone settings, a Bluetooth enabled navigation device may be used to correctly work with the ever changing spectrum of mobile phone models, manufacturers, etc., model/manufacturer specific settings may be stored on the navigation device 200 for example. The data stored for this information can be updated.

In FIG. 3 the navigation device 200 is depicted as being in communication with the server 302 via a generic communications channel 318 that can be implemented by any of a number of different arrangements. The server 302 and a navigation device 200 can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fibre optic cables, converters, radio-frequency (RF) waves, the atmosphere, empty space, etc. Furthermore, the communication channel 318 can include intermediate devices such as routers, repeaters, buffers, transmitters, and receivers, for example.

In one illustrative arrangement, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc.

The server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated automatically or upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

As indicated above in FIG. 2, a navigation device 200 includes a processor 210, an input device 220, and a display screen 240. The input device 220 and display screen 240 are integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device 241, such as audio input/output devices for example.

Figure 4A:
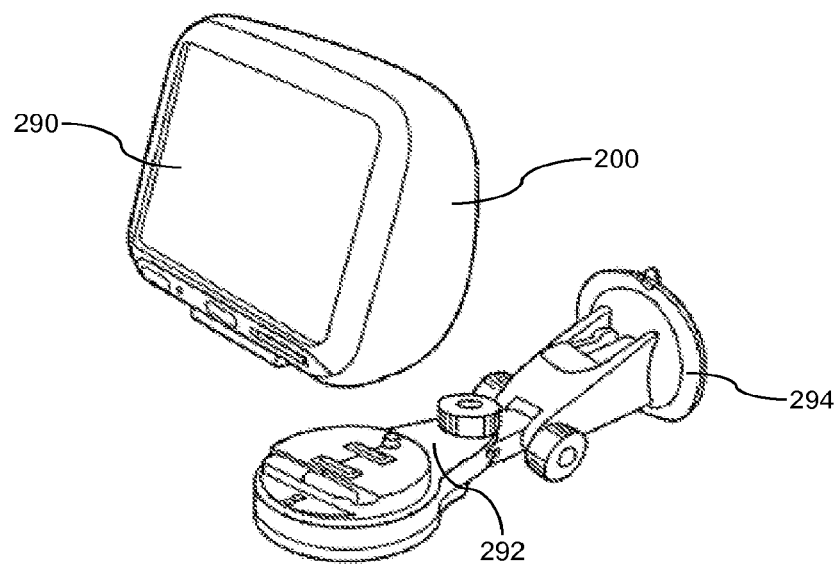
FIGS. 4A and 4B are illustrative perspective views of a navigation device.
Figure 4B:
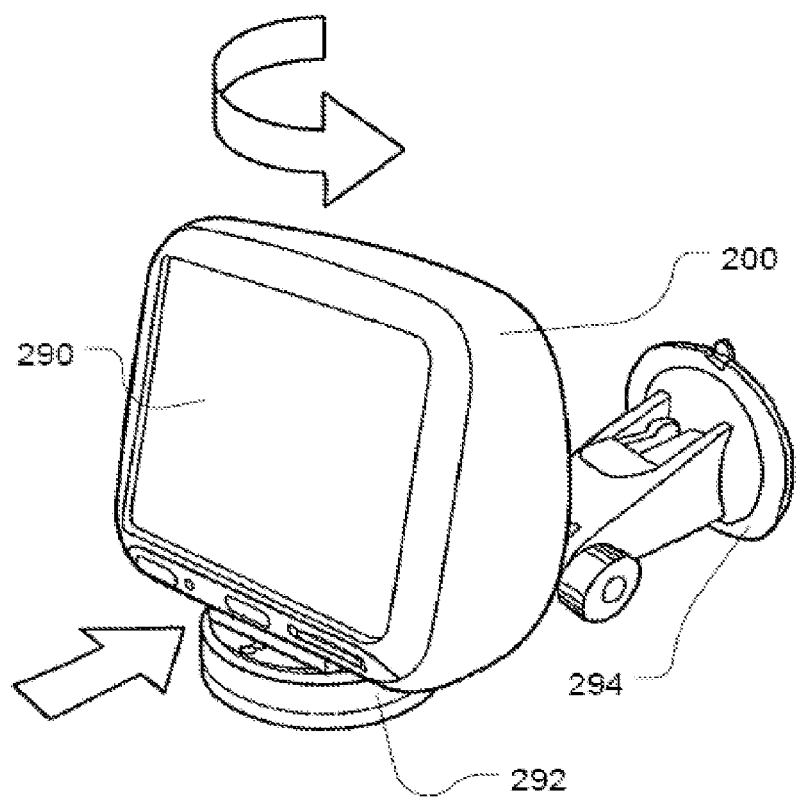

FIGS. 4A and 4B are perspective views of a navigation device 200. As shown in FIG. 4A, the navigation device 200 may be a unit that includes an integrated input and display device 290 (a touch panel screen for example) and the other components of FIG. 2 (including but not limited to internal GPS receiver 250, microprocessor 210, a power supply, memory systems 230, etc.).

The navigation device 200 may sit on an arm 292, which itself may be secured to a vehicle dashboard/window/etc. using a suction cup 294. This arm 292 is one example of a docking station to which the navigation device 200 can be docked.

As shown in FIG. 4B, the navigation device 200 can be docked or otherwise connected to an arm 292 of the docking station by snap connecting the navigation device 292 to the arm 292 for example. The navigation device 200 may then be rotatable on the arm 292, as shown by the arrow of FIG. 4B. To release the connection between the navigation device 200 and the docking station, a button on the navigation device 200 may be pressed, for example. Other equally suitable arrangements for coupling and decoupling the navigation device to a docking station are well known to persons of ordinary skill in the art.

Figure 5:
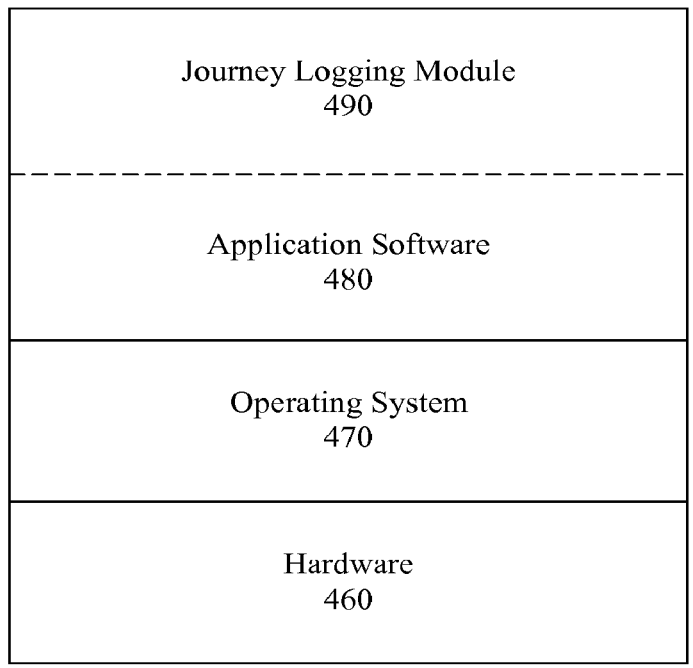
FIG. 5 is a schematic representation of the software employed by the navigation device.

Referring now to FIG. 5 of the accompanying drawings, the memory resource 230 stores a boot loader program (not shown) that is executed by the processor 210 in order to load an operating system 470 from the memory resource 230 for execution by functional hardware components 460, which provides an environment in which application software 480 can run. The operating system 470 serves to control the functional hardware components 460 and resides between the application software 480 and the functional hardware components 460. The application software 480 provides an operational environment including the GUI that supports core functions of the navigation device 200, for example map viewing, route planning, navigation functions and any other functions associated therewith. Part of this functionality comprises a journey logging module 490.

The journey logging module 490 stores journey information associated with journeys made by the navigation device 200. When operational, whether following a predetermined route or "free-driving", the journey logging module 490 stores journey information identifying a route followed by the navigation device 200 i.e. information identifying the path of the navigation device 200 in a journey file. In one embodiment, the journey logging module 490 stores information identifying a position of the navigation device 200 in a predetermined coordinate system at a regular time intervals. The time interval may be the region of 5 to 10 seconds, although other time intervals may be used. In another embodiment, the journey logging module 490 stores information identifying the position of the navigation device 200 at predetermined distance intervals e.g. every 5 meters, although it will be realised that other distances may be used. The journey information file may be stored as a series of discrete points, or a non-discrete representation of the journey i.e. as a spline. In addition, the journey logging module 490 may store additional information in the journey file. In various embodiments the journey information includes information indicative of whether the navigation device 200 is mounted on the arm 292 and/or information indicative of an operation state of a vehicle engine i.e. running or stopped. Information regarding mounting on the arm 292 may be determined by a switch in a body of the navigation device 200, whilst information regarding the vehicle's engine status may be obtained from communication of the navigation device 200 with an electrical system of the vehicle.

The journey information may be stored in one or more journey files held in the memory 230 of the navigation device 200. One journey file may be stored containing journey information for one of more journeys made per unit time i.e. day. Thus, over a plurality of days, a plurality of journey files are stored in the memory 230, each journey file containing journey information for a respective day.

The one or more journey files stored in the memory 230 are periodically communicated to the server 302. The one or more journey files are communicated to the server 302 via the communications channel 318 for storage in the mass data storage 312. The journey files may be communicated to the server 302 at regular intervals e.g. once a week, or whenever the communications channel 318 is available. In this way, over time, the server 302 accumulates journey files received from a plurality of navigation devices 200 identifying journeys made by those navigation devices 200.

In another embodiment, journey information may be communicated to the server 302 individually for each journey e.g. following completion of the journey.

Utilising the journey information received by the server 302 from a plurality of navigation devices 200, the server 302 is arranged to determine parking areas and Parking Availability Profiles (PAPs) for those parking areas. A parking area is a geographical area in which a plurality of navigation device 200 users have parked a vehicle. A PAP comprises an estimate of parking availability in one or more time periods for a respective parking area. The estimate is based upon historical data received from a plurality of navigation devices 200.

Figure 6:
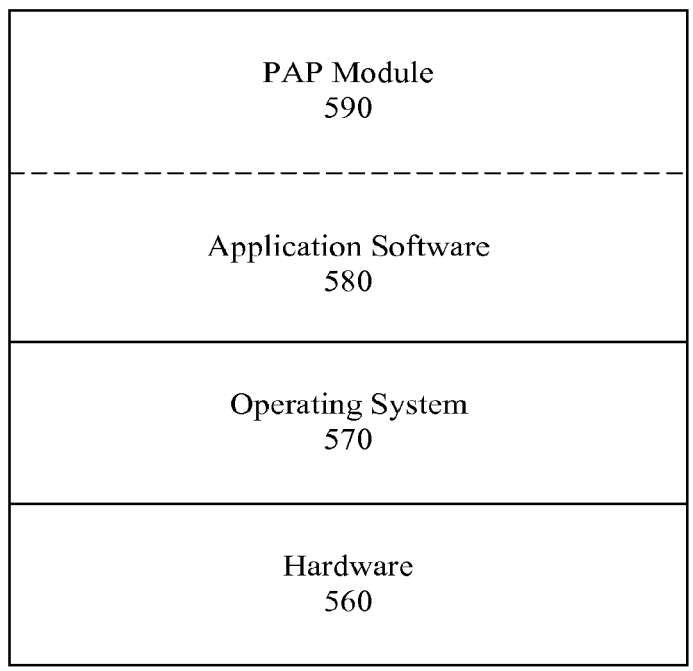
FIG. 6 is a schematic representation of the software employed by a server

FIG. 6 illustrates the software employed by the server 302. Hardware 560 of the server 302 supports an operating system 570 which provides an operating environment for execution of application software 580. Part of the server application software 580 comprises a Parking Availability Profile (PAP) module 590, the function of which will now be described in more detail in conjunction with the accompanying figures.

Figure 7:
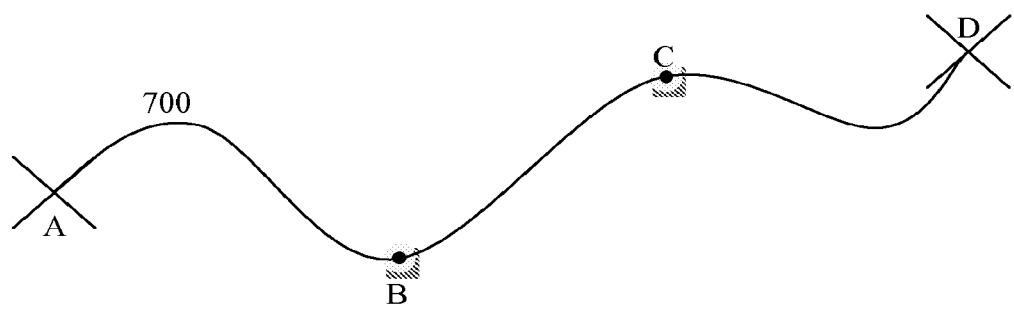
FIG. 7 is an illustration of a journey trace stored by the navigation device.

FIG. 7 illustrates a journey trace 700 stored in a journey file by the journey logging module 490 executing on the navigation device 200. The journey trace 900 is recorded whilst the navigation device 200 is in motion i.e. carried by a vehicle. The journey begins at a start location A, ends at a destination location D and passes through intermediate locations B and C. The journey trace 700 is formed by a plurality of discrete location points stored at regular time intervals, which each identify the location of the navigation device 200 at that time. The PAP module 590 executing on the processor 304 of the server 302 is arranged to perform a parking area determination process by analysing the journey information received from the plurality of navigation devices to determine a location and extent of one or more parking areas. In one embodiment, the server 302 determines that a start and end of each journey 900 are within parking areas. However, a reliability of the parking area determination process may be improved in one or more ways, as will be discussed.

Firstly, in some embodiments, the journey logging module 490 of the navigation device 200 is arranged to include in the journey information an indication of whether the navigation device 200 was mounted in upon the arm 292 whilst the journey trace 900 was stored. Such information may be stored as a flag at each location indicating the mounting of the navigation device 200 on the arm 292 at that location. Furthermore, the journey logging module 490 may indicate in the journey information whether the navigation device was communicatively coupled with a vehicle in which the navigation device 200 is mounted, for example by a Bluetooth connection. Once communicatively coupled to the vehicle, the journey logging module 290 of the navigation device 200 determines and stores information in the journey file identifying locations when an engine of the vehicle starts and stops. The journey logging module 490 of the navigation device 200 may, in one embodiment, obtain information relating to the starting and stopping of the vehicle engine over a communication bus of the vehicle e.g. CAN bus. Alternatively, audio data received from a microphone 240 of the navigation device 200 may be analysed to determine whether the vehicle's engine is running. In other embodiments, the journey logging module 490 of the navigation device 200 may indicate in the journey information power information indicating when the navigation device 200 is connected to and disconnected from a power supply. This would indicate when the vehicle's electricity system was activated/deactivated or when the user plugged and unplugged the navigation device 200 to the vehicle power supply. Further confidence may be gained from combining the power information with GPS information. For example, it the navigation device 200 is connected to an active power supply and a GPS signal is received shortly thereafter, the journey start location may be assumed and an indication thereof stored in the journey information. Other information stored in the journey file may indicate an output of one or more of: an accelerometer or a light sensor, indicating acceleration and light levels respectively, in the navigation device 200 o Referring to FIG. 7, the journey trace 700 contains information identifying two places, B and C, along the route of the journey trace 700. At these places, the journey information indicates that the vehicle stopped and started. However, these locations may not necessarily be parking locations. For example, location B may be an area leading up to a railway crossing for example, where vehicles must wait for a few minutes on some occasions. Further, location C may be a traffic jam experienced by the user on that journey. In order to isolate locations B and C as not being parking locations, the PAP module 590 executing on the server 302 is, in some embodiments, arranged to detect a peak in a number of estimated parking locations against time. For example, if users of navigation devices only appear to park in a location at a specific time e.g. 13:30-13:40, then it is possible to isolate that location as not being a parking location. The location may be a periodic stop in vehicular traffic e.g. at a bridge. Further, if a possible parking location is determined and other journey information, either from the same or other navigation devices 200, indicates that they pass through the location on some occasions at greater than a predetermined speed e.g. greater than 20 kmh$^{-1}$, then that location may be isolated as not being a parking location.

By combining journey information from a plurality of navigation devices 200, the PAP module 590 executing on the server 302 is arranged to determine parking locations. If a parking location is determined from the journey information received from a single navigation device 200, then parking location may be determined incorrectly. For example, a user may park illegally, or in a private parking space. In order to avoid this, the PAP module 590 is arranged to identify parking locations by requiring that a plurality of navigation devices 200 have parked in that area. In this way, a likelihood of incorrectly determining a parking location is reduced. The PAP module 590 may require that more than a predetermined number n of navigation devices are determined to park at a location within a predetermined period of time before that location is determined to be a parking location.

Figure 8:
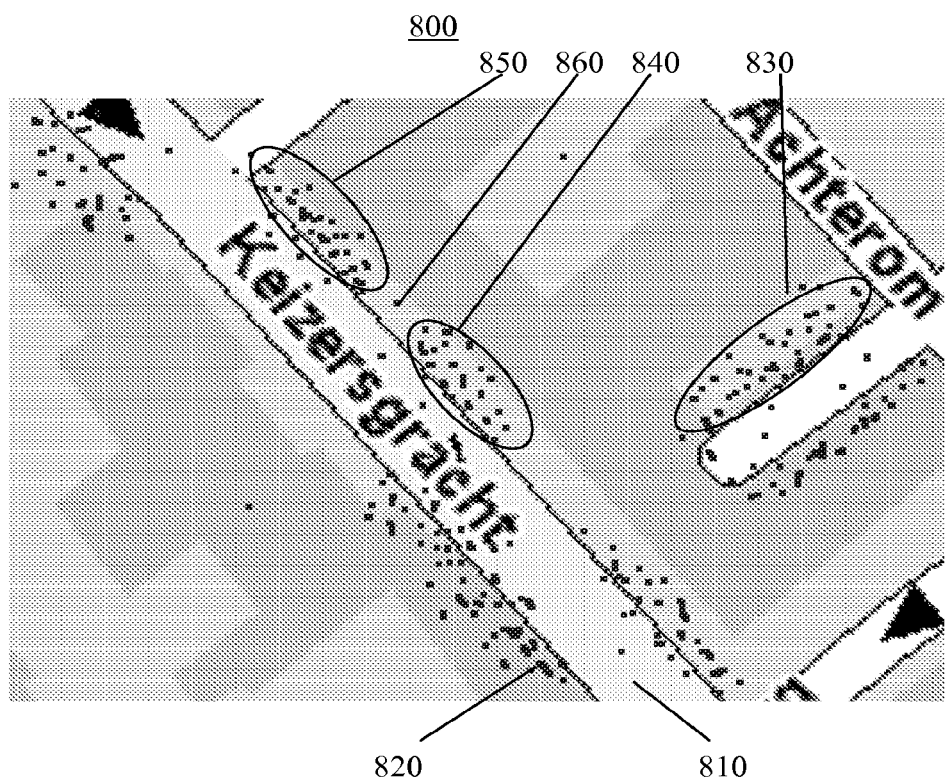
FIG. 8 is an illustration of map data and parking areas determined by the server.

FIG. 8 shows an illustration of map data 800 around a street Keizersgracht 810. Against the map data 800, a plurality of parking locations determined by the PAP module 590 at which vehicles have parked are each indicated with dots 820. As noted above, the parking location may be determined as a start and/or end of a journey trace, or a start or end of a journey trace where predetermined conditions are met e.g. the navigation device 200 is mounted on the arm 292 at the start/end of the journey trace. It can be observed from FIG. 8 that the parking locations are formed in defined clusters 830, 840, 850 (not all of which are indicated for clarity) in different areas. For example, along the street Keizersgracht 810, a plurality of clusters 830, 840, 850 are formed with an area there-between having a single parking location 860. Therefore, the PAP module 590 identifies clusters in the parking locations. A cluster may be identified as an area having more than a predetermined number of parking locations per unit area in a predetermined time period. Parking areas 830, 840, 850 may be fitted to the cluster by using a shape-fitting algorithm. The area in between the clusters 830, 840, 850 may be an outwardly projecting part of a pavement adjacent to the road on which a user has parked illegally, or a result of a GPS error. Therefore, the single parking location does not form part of either parking area 830, 840, 850 as it does not comprise a plurality of parking locations. Information associated with each parking area 830, 840, 850 may be stored in a parking database accessible by the server 302.

Figure 9:
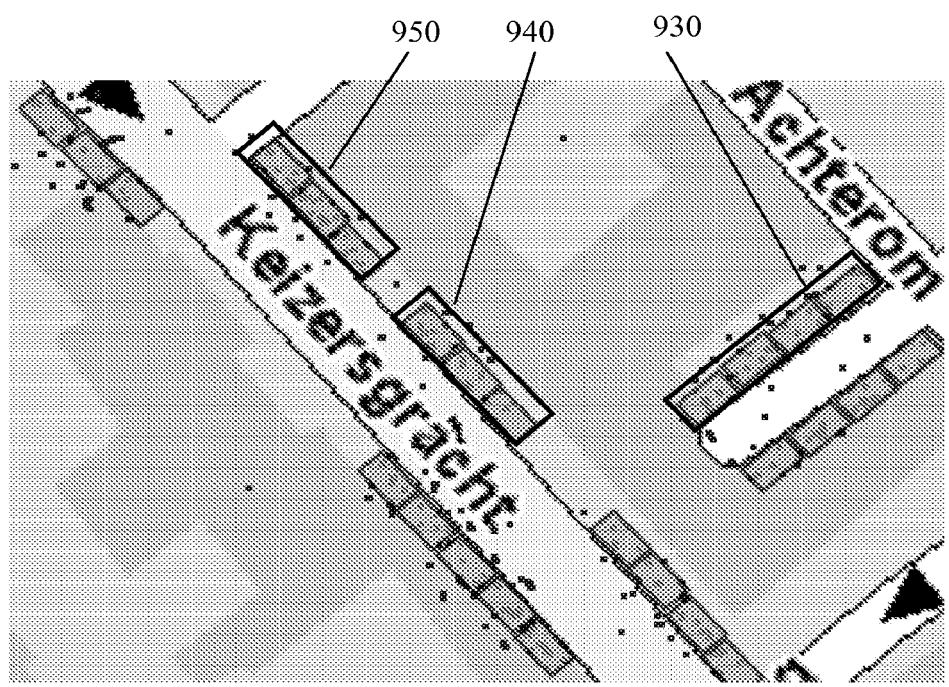
FIG. 9 is an illustration of the map data and parking places determined by the server.

Once a shape and location of one or more parking areas 830, 840, 850 have been determined by the PAP module 590 on the server 302, the PAP module 590 is configured to determine a number of parking spaces available in each parking area 830, 840, 850. In one embodiment, the number of parking spaces available in a parking area may be determined by analysing the journey information received from a plurality of navigation devices 200 to determine a maximum number of vehicles simultaneously parked in that parking area. However, it is possible that not all vehicles simultaneously parked in the parking area included a navigation device 200 operative to store journey information. In another embodiment, the number of available parking spaces is determined by considering a size of an average vehicle and a size of each parking area 830, 840, 850. For some parking areas 830, 840, 850, such as on-street parking areas, vehicles are only able to park in a linear manner, that is end-to-end. For these areas, a length of a vehicle is compared against a length of the parking area. Ideally, a length of the vehicle in which the navigation device 200 is utilised would be known, e.g. communicated to server 302 in the journey file, to accurately determine the number of available spaces. However, if this is not known, an average vehicle length may be utilised. The number of available spaces may be determined as the quotient of the length of the parking area divided by vehicle length (either known or average), including an estimation of average inter-vehicle parking distance. Additionally, this may be compared against the maximum number of vehicles simultaneously parked in that parking area to ensure that the two agree to within a predetermined number of vehicles. For a parking area in which pluralities of vehicles may be parked in both dimensions i.e. wide enough to accommodate more than two parked vehicles, the number of parking spaces available may be determined by also considering a quotient of vehicle width (either known or average), including an estimation of average inter-vehicle parking width, against a width of the parking area. FIG. 9 shows a further illustration of the map data shown in FIG. 8 indicating a determined number of parking places determined by the PAP module 590 to be in each parking area. The parking area 930 is determined by the PAP module 590 to include four linearly-arranged vehicle spaces, the parking area 940 three spaces and the parking area 950 four spaces.

Figure 10:
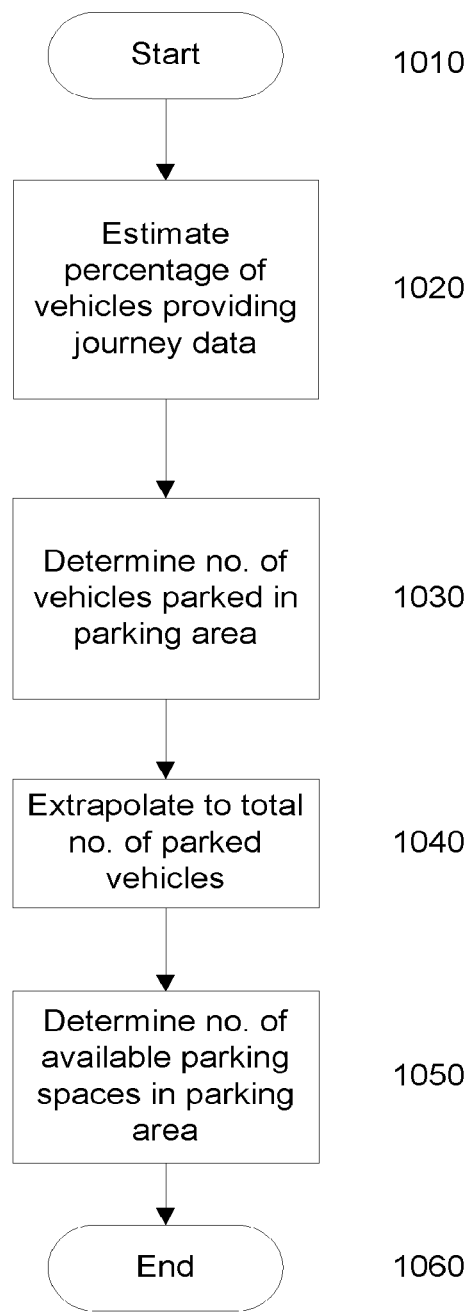
FIG. 10 is an illustration of a method of determining a parking availability profile according to an embodiment of the invention.

The PAP module 590 on the server 302 is then arranged to determine a parking availability profile (PAP) for each of the parking areas 930, 940, 950. The PAP for each parking area may also be stored in the parking database accessible to the server 302. The parking database may also be associated with a map database, such that PAPs are associated with road segments identified in the parking database, such that the sever 302 is able to retrieve PAPs with respect to a road segment in the map database. An embodiment of a method of determining a parking availability profile for a parking area will be explained with reference to FIG. 10.

A PAP indicates, for a respective parking area 930, 940, 950 a likelihood of a parking space being available during a plurality of predetermined time periods. In some embodiments, the PAP comprises an indication of a number of free parking spaces and/or an indication of a frequency at which vehicles vacate parking places for each of the plurality of time periods. The PAP module 590 on server 302 determines the parking availability profile for each parking area 930, 940, 950 for a plurality of timeslots. Each day of the week may be divided into a number of equally or unequally sized time slots. In one embodiment, each twenty four hour period may be divided into 1-hour timeslots. However, it will be realised that timeslots of other durations may be used. In another embodiment, each day may be divided into sixteen timeslots of 45 minute duration between the hours of 6 a.m. to 6 p.m. and eight timeslots of 90 minutes duration during the hours of 6 p.m. to 6 a.m. when it expected that parking spaces experience less activity. It will be realised that the timeslot durations and hours of division are merely provided as an example and that other durations may be used. Further, seasonally varying timeslots/periods may be introduced. For example, utilising different timeslot durations in the summer months of July and August reflecting that many in cities are on holiday and parking places may be more widely or freely available. Thus, the PAP is divided into a plurality of even or unevenly divided timeslots or time-periods.

For each timeslot, the PAP module 590 on the server 302 is arranged to determine the parking availability data based upon the received journey information and an estimate of a percentage of vehicles equipped with navigation devices 200 operative to record journey information.

In step 1020 the server 302 determines the estimate of the percentage of vehicles equipped with navigation devices 200 operative to record journey information. The estimate may be determined across all time periods as a general estimate of the percentage, a day which includes the timeslot or may be for the timeslot itself. An estimate for a smaller unit of time including the timeslot is likely to be more accurate. The estimate may be determined by considering a percentage of vehicles equipped with navigation devices 200 operative to record journey information in a predetermined area. In one embodiment, a traffic jam proximal to the parking area is utilised to estimate the percentage. A length of the traffic jam may be determined and a number of vehicles in that traffic jam estimated by considering the average length of a vehicle and an average inter-vehicle spacing. Furthermore, a number of adjacent lanes of a road carrying the traffic jam may be considered. The number vehicles having navigation devices 200 operative to record journey information determined to be in that traffic jam from received journey information is then compared against the total number of vehicles. For example, the percentage of vehicles equipped with navigation devices 200 operative to record journey information in the area proximal to the parking area may be determined to be 20%.

In step 1030, the server 302 determines, for each timeslot, a number of vehicles having navigation devices 200 operative to record journey information which are parked in that parking area 930, 930, 950 based upon received journey information. For example, the PAP module 590 may determine there to be an average of 3.8 vehicles for which journey information is collected, i.e. that store journey information, that are parked in a particular parking area 930, 930, 950 during a 3-4 pm timeslot on a Thursday.

In step 1040, using the previously determined information, parking availability data which is an estimated total number of vehicles parked in that parking area 930, 930, 950 during each timeslot may be determined based upon the previously estimated percentage of vehicles equipped with a navigation device 200 operative to record journey information. For example, if during a particular timeslot for a particular parking area 930, 930, 950 the average of 3.8 vehicles are parked in a parking area, and 20% of vehicles are determined to be equipped with a navigation device 200 operative to record journey information, then there are estimated to be 19 vehicles parked in that parking area 930, 930, 950 during the timeslot considered.

In step 1050, the number of available parking spaces is determined. If the parking area has 25 parking spaces, then the parking availability data for that parking area 930, 930, 950 during the particular timeslot indicates that there are 6 spaces available, using the equation:

$$Avail = PPlaces - \left(\frac{P_{NDev}}{R_{NDev}}\right)$$

wherein Avail is a number of currently available parking places, PPlaces is a total number of parking places determined to be in the parking area, $P_{NDev}$ is an average number of navigation devices determined to be in that parking area during the time period under consideration and $R_{NDev}$ is a fraction of vehicles equipped with navigation devices.

Alternative or additional to the above, the PAP module 590 of the server 302 may determine a number of available parking places based upon a maximum number of navigation devices 200 simultaneously present in a parking area 930, 930, 950. For example, a maximum number of navigation devices present in a parking area at night may be considered a most reliable indication to be used. Advantageously, using such a determination based on the maximum number of navigation devices is useful when it is believed that a local fraction of vehicles equipped with navigation devices differs from a normal fraction of navigation device equipped vehicles i.e. a greater number of navigation device equipped vehicles park in that locality. The number of available parking places at a given time may then be calculated by the following equation:

$$Avail = PPlaces - \left(\frac{L_{NDev}}{Max_{NDev}}\right) - \left(\frac{P_{NDev}}{R_{NDev}}\right)$$

wherein $L_{NDev}$ is a number of navigation devices determined to leave that parking area during a first period e.g. during the daytime, $Max_{NDev}$ is a maximum number of navigation devices having been simultaneously in the parking area during a second period e.g. night-time. In this way, a number of available parking spaces may be determined including consideration of a local number of navigation device equipped vehicles.

Parking movement data may be determined by the server 302 in a similar manner to the parking availability data. Parking movement data indicates how regularly vehicles leave the parking area or vacate parking spaces in the parking area. Firstly, a number of vehicles equipped with navigation devices 200 operative to store journey information which leave or move from a parking area 930, 930, 950 during a timeslot is determined by the server 302 from received journey information. The Mean Time Between Vehicles Leaving (MTBVL) for that timeslot and parking area 930, 930, 950 may be determined by dividing the duration of the timeslot by the number of vehicles leaving in that timeslot to calculate in the MTBVL in units of minutes per vehicle.

Figure 11:
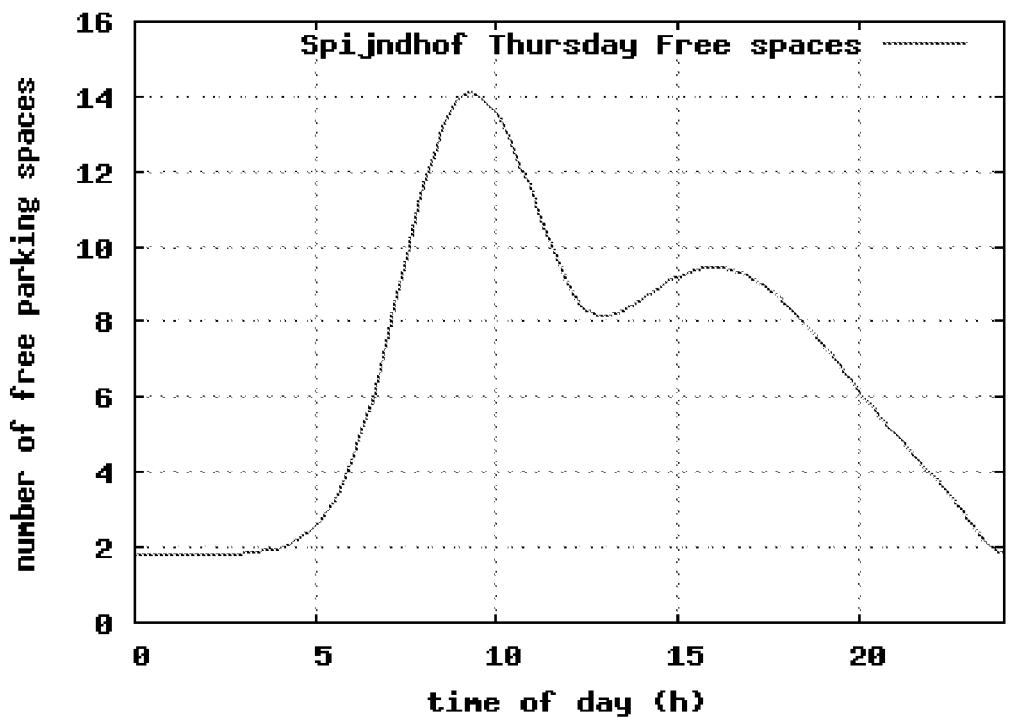
FIG. 11 is an illustration of parking availability profile for a parking area according to an embodiment of the invention.

The PAP comprises, for each location, parking availability data which is a time-variant indication of a number of available spaces. FIG. 11 shows an illustration of the parking availability data for a geographical location during a 24 hour period. The geographical location is a residential street named Spijndhof on a Thursday. As can be seen, during the hours of approximately 12-5 a.m. approximately 2 spaces are available. At around 6-9 a.m. the number of available spaces increases, e.g. as people leave for work. At around 10 a.m. the number of available spaces drops slightly, then rises from approximately 1 p.m. until 4 p.m. when the number of available spaces gradually falls until around midnight.

Figure 12:
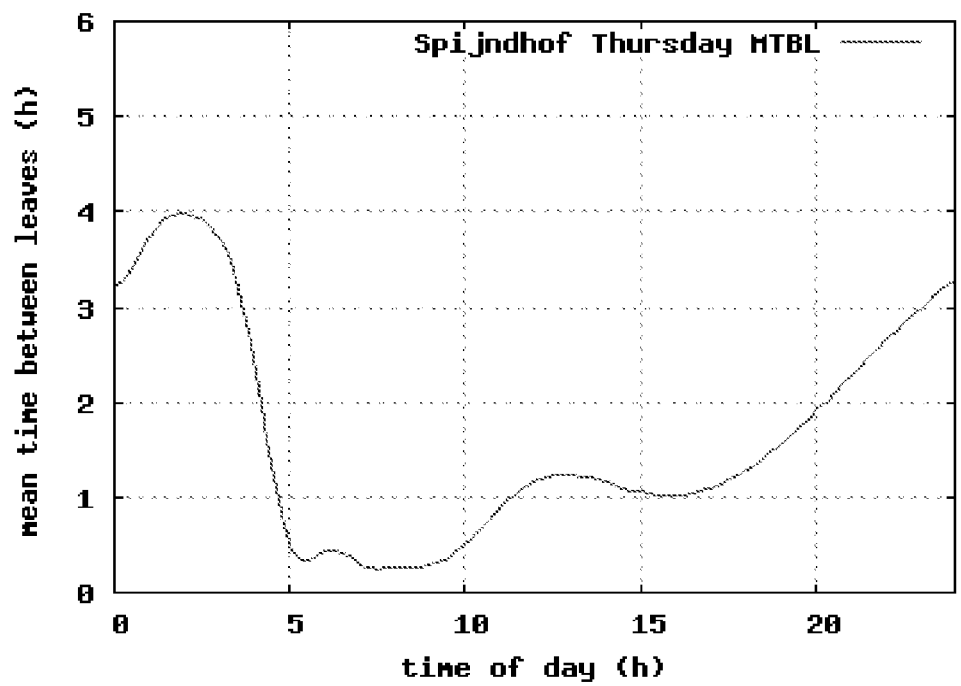
FIG. 12 is an illustration of parking movement data for the parking area according to an embodiment of the invention.

In some embodiments, the PAP further comprises parking movement data which is a time variant indication of a frequency at which parking spaces become available. That is, a frequency at which parked vehicles leave parking spaces. The PAP indicates the MTBVL. As shown in FIG. 12, the parking movement data indicates that between midnight and 4 a.m. the MTBVL is relatively high at between 3-4 hours indicating that vehicles do not leave very often. However, as daytime approaches at around 4 a.m. the MTBVL falls to around 30 minutes, which is maintained until approximately 10 a.m., when it rises gradually for the remainder of the day.

Furthermore, in some embodiments, the PAP indicates tariff information for one or more parking areas. Tariff information may be provided for any parking areas 930, 940, 950 determined to require payment for parking i.e. commercially operated or chargeable parking. Tariff information may be obtained from a municipal authority e.g. council or state operating the parking area, or from a commercial provider of the parking area. The tariff information may be stored in the parking database associated with the PAP.

Figure 13:
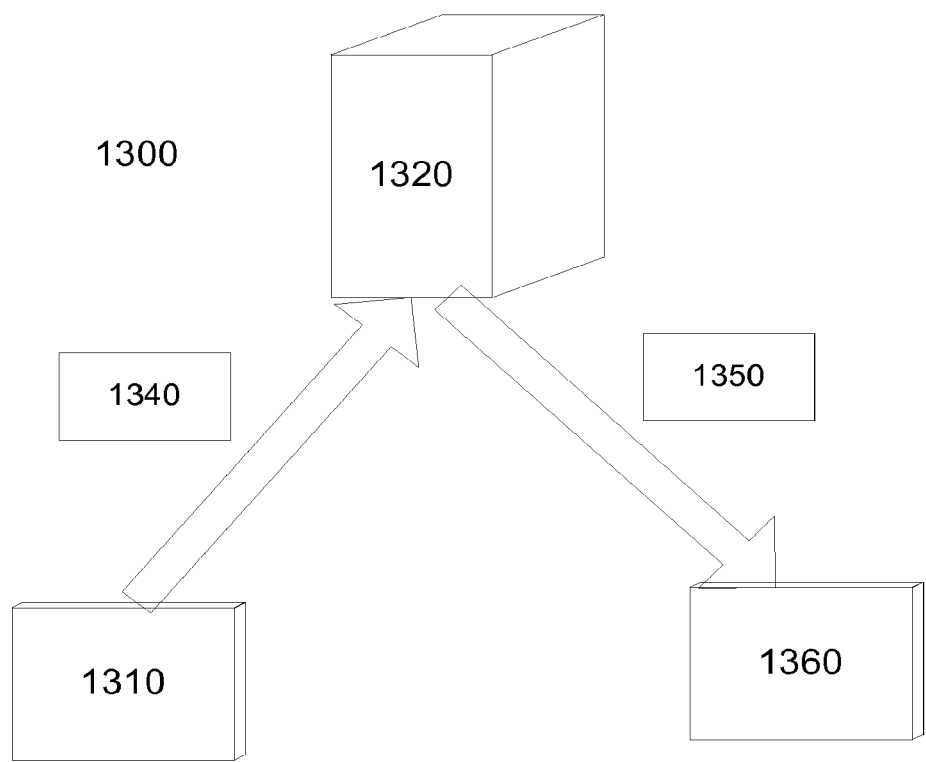
FIG. 13 illustrates a system according to an embodiment of the invention.

Once a PAP has been determined for a parking area it may be communicated to a navigation device. FIG. 13 illustrates a system according to an embodiment of the present invention. The system 1300 comprises a server 1302 communicatively coupled to a first navigation device 1310 from which journey information 1340 is received, as previously described. The server 1320 operatively determines a location of parking areas 930, 940, 950 and PAPs for those parking areas 930, 940, 950 which are stored in a parking database (not shown) accessible by the server 1320. One or more PAPs 1350 are communicated to a second navigation device 1360 by the server 1320. The second navigation device 1360 may be the same device as the first navigation device 1310. That is the PAP may be sent to a device previously having communicated journey information to the server 1320. The journey information 1340 may be sent to the server 1320 by the first navigation device 1310 upon request by the server 1320, or may be transmitted by the navigation device 1310 when communication with the server 1320 is possible. The PAP 1350 may be communicated to the second navigation device 1360 upon request by the second navigation device 1360. The second navigation device 1360 may request one or more PAPs 1350 to be transmitted from the server 1320 for parking areas 930, 940, 950 within a predetermined distance of the second navigation device 1360. For example, the second navigation device 1360 may have a parking mode which once enabled, either by a user input or when the second navigation device is within a predetermined distance of a destination location, transmits a PAP request message to the server 1320 to request transmission of the one or more PAPs. In one embodiment, the server 1320 may retrieve one or more PAPs from the parking database and then communicate those PAPs 1350 to the second navigation device 1360 at predetermined time intervals. The second navigation device may then use the received PAPs 1350 to provide information to a user regarding the availability of parking spaces proximal to the current location on the display device 240, for example as shown in FIG. 14.

Figure 14:
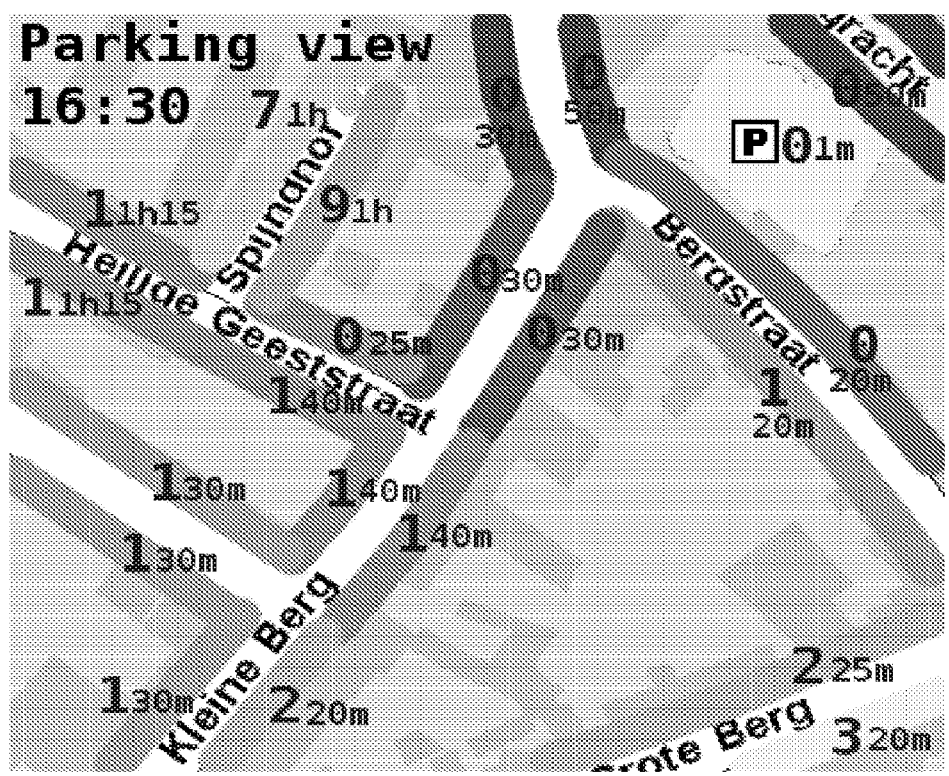
FIG. 14 illustrates a display of parking information on a navigation device according to an embodiment of the invention.

FIG. 14 illustrates an area of map data showing streets and parking areas adjacent to those streets. The map data including an indication of the parking areas may be displayed by the second navigation device 1360 upon a display thereof. A numerical indication is provided next to each parking area identifying how many parking spaces are estimated to be available in that parking area at a particular time e.g. the current time. An indication of the MTBVL for each parking area is also provided so that, even if no spaces are current available, the user can determine a likelihood of a spacing become available in that parking area. Each parking area may be displayed in a colour based upon one or both of the number of parking spaces estimated to be available and/or the MTBVL.

It will be apparent from the foregoing that the teachings of the present invention provide an arrangement whereby parking information is determined for parking areas based upon journey information received from navigation devices. Advantageously, the parking information may be determined for parking areas, such as on-street parking areas, which are not commercially operated etc. The parking information indicates an availability of parking places and, in some embodiments, a frequency at which vehicles vacate parking places.

It will also be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, whilst embodiments described in the foregoing detailed description refer to GPS, it should be noted that the navigation device may utilise any kind of position sensing technology as an alternative to (or indeed in addition to) GPS. For example the navigation device may utilise using other global navigation satellite systems such as the European Galileo system. Equally, it is not limited to satellite based but could readily function using ground based beacons or any other kind of system that enables the device to determine its geographic location.

It will also be well understood by persons of ordinary skill in the art that whilst the preferred embodiment implements certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A method of determining parking information, comprising:
 receiving, at a server, journey information identifying a route followed from a plurality of navigation devices, the journey information indicating one or more journeys made by each navigation device; and
 determining, by the server, parking information indicating a geographical location of one or more parking areas based upon the journey information, the determining comprising identifying, based on the journey information, parking areas that were not previously identified in corresponding map data,
 wherein the determination of the geographical location of the one or more parking areas is based upon the journey information indicating that a predetermined number of vehicles have parked in each parking area during a predetermined time period.

2. The method of claim 1, further comprising determining, for the one or more of the parking areas, a number of parking places associated with each parking area.

3. The method of claim 1, further comprising determining, for the one or more parking areas, a parking availability profile indicating a number or parking places available in each parking area during a plurality of time periods.

4. The method of claim 3, wherein the determination of the parking availability profile is based upon a fraction of vehicles having navigation devices operable to store the journey information and a number of navigation devices operable to determine the journey information present in each parking area during the plurality of time periods, wherein the fraction of vehicles having navigation devices operable to store the journey information is a percentage of the number of vehicles having navigation devices operable to store the journey information to a total number of vehicles.

5. The method of claim 3, wherein the parking availability profile further indicates a number of vehicles leaving each parking area per unit time during the plurality of time periods.

6. The method of claim 3 further comprising transmitting from the server to a navigation device one or more of the parking availability profiles in response to a request received from the navigation device.

7. The method of claim 6, wherein the request includes information identifying a current location of the navigation device and the server selects the one or more parking availability profiles to be transmitted to the navigation device according to the location information.

8. The method of claim 1, wherein the identified route comprises a series of discrete points or a non-discrete representation of the journey.

9. An apparatus for determining parking information, comprising:
 a data communications device, wherein the data communications device receives journey information identifying a route followed from a plurality navigation devices, the journey information indicating one or more journeys made by each of the plurality of navigation devices;
 a processor, wherein the processor determines, from the journey information, parking information indicating a geographical location of one or more parking areas, the determining comprising identifying, based on the journey information, parking areas that were not previously identified in corresponding map data,
 wherein the determination of the geographical location of the one or more parking areas is based upon the journey information indicating that a predetermined number of vehicles have parked in each parking area during a predetermined time period.

10. The apparatus of claim 9, wherein the processor further determines, for one or more of the parking areas, a number of parking places in each parking area.

11. The apparatus of claim 9, wherein the processor further determines, for one or more parking areas, a parking availability profile indicating a number or parking places available in each parking area during a plurality of time periods.

12. The apparatus of claim 11, wherein the determination of the parking availability profile is based upon a fraction of vehicles having navigation devices operable to store the journey information and a number of navigation devices operable to determine the journey information present in each parking area during the plurality of time periods, wherein the fraction of vehicles having navigation devices operable to store the journey information is a percentage of the number of vehicles having navigation devices operable to store the journey information to the total number of vehicles.

13. The apparatus of claim 11, wherein the parking availability profile further indicates a number of vehicles leaving each parking area per unit time during the plurality of time periods.

14. The apparatus of claim 11, wherein the apparatus transmits one or more of the parking availability profiles to a navigation device in response to a request received from the navigation device.

15. The apparatus of claim 14, wherein the request includes information identifying a current location of the navigation device and the apparatus selects the one or more parking availability profiles to be transmitted to the navigation device according to the location information.

16. A non-transitory computer-readable medium which stores a set of instructions which when executed by a processor performs a method for determining parking information, the method executed by the set of instructions comprising:
 receiving journey information identifying a route followed from a plurality of navigation devices, the journey information indicating one or more journeys made by each navigation device; and
 determining parking information indicating a geographical location of one or more parking areas based upon the journey information, the determning comprising identifying, based on the journey information, parking areas that were not previously identified in corresponding map data,
 wherein the determination of the geographical location of the one or more parking areas is based upon the journey information indicating that a predetermined number of vehicles have parked in each parking area during a predetermined time period.

17. The non-transitory computer-readable medium of claim 16, further comprising determining, for the one or more of the parking areas, a number of parking places associated with each parking area.

18. The non-transitory computer-readable medium of claim 16, further comprising determining, for the one or more parking areas, a parking availability profile indicating a number or parking places available in each parking area during a plurality of time periods.

19. The non-transitory computer-readable medium of claim 18, wherein the determination of the parking availability profile is based upon a fraction of vehicles having navigation devices operable to store the journey information and a number of navigation devices operable to determine the journey information present in each parking area during the plurality of time periods, wherein the fraction of vehicles having navigation devices operable to store the journey information is a percentage of the number of vehicles having navigation devices operable to store the journey information to a total number of vehicles.

20. The non-transitory computer-readable medium of claim 18, wherein the parking availability profile further indicates a number of vehicles leaving each parking area per unit time during the plurality of time periods.

* * * * *